United States Patent
Ye et al.

(10) Patent No.: US 8,504,664 B2
(45) Date of Patent: Aug. 6, 2013

(54) METHODS, SYSTEMS, AND COMPUTER READABLE MEDIA FOR A VALIDATION FRAMEWORK FOR VALIDATING COMMANDS FOR CONFIGURING ENTITIES IN A TELECOMMUNICATIONS NETWORK

(75) Inventors: Nan Ye, Shanghai (CN); Jun Shen, Shanghai (CN)

(73) Assignee: Genband US LLC, Plano, TX (US)

( * ) Notice: Subject to any disclaimer, the term of this patent is extended or adjusted under 35 U.S.C. 154(b) by 432 days.

(21) Appl. No.: 12/506,234

(22) Filed: Jul. 20, 2009

(65) Prior Publication Data

US 2011/0016202 A1    Jan. 20, 2011

(51) Int. Cl.
*G06F 15/177*    (2006.01)

(52) U.S. Cl.
USPC ......... 709/222; 709/224; 379/207.13; 710/55

(58) Field of Classification Search
USPC ......... 709/206, 222, 224; 379/207.13; 710/55
See application file for complete search history.

(56) References Cited

U.S. PATENT DOCUMENTS

| 6,286,035 B1* | 9/2001 | Gillis et al. | 709/206 |
| 2006/0126530 A1* | 6/2006 | Fuhrmann et al. | 370/252 |
| 2008/0294754 A1* | 11/2008 | Lu et al. | 709/220 |

OTHER PUBLICATIONS

Declaration Regarding Work of Former Employee (Aug. 12, 2009).

* cited by examiner

*Primary Examiner* — El Hadji Sall
(74) *Attorney, Agent, or Firm* — Jenkins, Wilson, Taylor & Hunt, P.A.

(57) ABSTRACT

Methods, systems, and computer program products for implementing a validation framework for validating commands for configuring entities in a telecommunications network are disclosed. According to one aspect, the subject matter described herein includes a method for implementing a validation framework for validating commands for configuring entities in a telecommunications network. The method includes providing, to a first computing system, a validation configuration file containing at least one rule for validating, based on domain knowledge of a network entity, commands for configuring the network entity, wherein the validation configuration file is provided from a developer of the network entity. The first computing system receives data associated with a command for configuring the network entity, validates the received data using the at least one rule, and, responsive to validating the data, performs at least one action.

28 Claims, 9 Drawing Sheets

METHODS, SYSTEMS, AND COMPUTER READABLE MEDIA FOR A VALIDATION FRAMEWORK FOR VALIDATING COMMANDS FOR CONFIGURING ENTITIES IN A TELECOMMUNICATIONS NETWORK

TECHNICAL FIELD

The subject matter described herein relates to element management systems (EMS) and network element (NE) systems. More particularly, the subject matter described herein relates to a validation framework for validating commands for configuring entities in a telecommunications network.

BACKGROUND

Communication networks can be composed of many network elements, such as switches, routers, media gateways, and multiplexers. These network elements may be monitored and managed by one or more management systems. Management systems may perform a variety of management functions including those related to fault detection, performance monitoring, accounting, configuration, and security (FCAPS). Typically, management systems are hierarchical for allowing network administrators to efficiently administer and troubleshoot a given area or subsystem of the network. For example, management data from a given type or system of NEs (e.g., a hybrid fiber/coax (HFC) cable-telephony system or digital cross-connect system) may be processed and analyzed at a given element management system (EMS).

FIG. 1 illustrates one example of a conventional hierarchical management system. In one embodiment, one or more element management systems may command, control, and monitor one or more network elements. In the embodiment illustrated in FIG. 1, communications network 100 includes EMS 102A, EMS 102B, and EMS 102C, collectively referred to as EMSes 102. Each EMS may control one or more network elements, collectively referred to as NEs 104. An EMS may interact with network administrators or third party applications, including higher level management systems, such as a network management system (NMS) or a operations support system (OSS), that analyze or control the interworking of multiple EMSs. In the embodiment illustrated in FIG. 1, EMSes 102 communicate with NMS/OSS 106, which may use EMSes 102 as an intermediary for controlling and managing NEs 104. It is therefore important that each EMS 102 communicates effectively with NEs 104.

Effective communication may involve an EMS being intimately aware of a managed NE's domain knowledge. As used herein, the term "domain knowledge" refers to information about the environment in which a system or network element operates, including information about the resources available within a network element itself. For example, the domain knowledge of a media gateway may include information about its protection groups, port numbers, and interfaces. NE domain knowledge is created or defined during NE development (e.g., by the software or hardware developers of the NE).

Typically, NE development is separate from EMS development. This may be the case even when both products are produced by the same company. As such, there is a typically a lack of communication and support between an EMS development team and NE development team. Accordingly, domain knowledge of an NE may not be provided or obtained in an effective or efficient manner. Instead, NE domain knowledge is usually gathered independently by the EMS development team. For example, an EMS development team may create and perform a variety of tests for communication and integration of an element and management system. Using these tests, the EMS development team may discover and fix bugs or issues, such as an incompatibility in validation logic. However, such tests may be cumbersome, expensive, and inefficient. For example, an EMS development team may develop inadequate integration tests and/or may receive information about an NE too late in the development process for adequate testing.

Accordingly, a need exists for methods, systems, and computer readable media for a validation framework for validating commands for configuring entities in a telecommunications network.

SUMMARY

According to one aspect, the subject matter described herein includes a method for implementing a validation framework for validating commands for configuring entities in a telecommunications network. The method includes providing, to a first computing system, a validation configuration file containing at least one rule for validating, based on domain knowledge of a network entity, commands for configuring the network entity, where the validation configuration file is provided from a developer of the network entity. The first computing system receives data associated with a command for configuring the network entity, validates the received data using the at least one rule, and, responsive to validating the data, performs at least one action.

According to another aspect, the subject matter described herein includes a system for validating commands for configuring entities in a telecommunications network. The system includes an interface module for receiving data associated with a command for configuring a network entity, and a validation engine for validating the received data using at least one rule from a validation configuration file and based on domain knowledge of the network entity, where the validation configuration file is provided from a developer of the network entity. In response to validating the data, the validation engine performs an action.

The subject matter described herein for a validation framework may be implemented using a computer readable medium having stored thereon executable instructions that when executed by the computer processor of a computer control the computer to perform steps. Exemplary computer readable media suitable for implementing the subject matter described herein includes disk memory devices, programmable logic devices, and application specific integrated circuits. In one implementation, the computer readable medium may include a memory accessible by a processor. The memory may include instructions executable by the processor for implementing any of the methods for a single-sourced validation framework described herein. In addition, a computer readable medium that implements the subject matter described herein may be located on a single device or computer platform or may be distributed across multiple physical devices and/or computing platforms.

BRIEF DESCRIPTION OF THE DRAWINGS

Exemplary embodiments of the subject matter will now be explained with reference to the accompanying drawings, of which.

DETAILED DESCRIPTION

The subject matter described herein includes methods, systems, and computer program products for a validation framework for validating commands for configuring entities in a telecommunications network. In one embodiment, the validation framework may be used by element management systems (EMSs) or network management systems (NMSs) to ensure valid configuration of network elements (NEs) in a telecommunications network. In one embodiment, the validation framework uses domain knowledge that is provided in the form of validation configuration files. For simplicity, the terms "domain knowledge", "domain information", and "validation information" are herein considered synonymous with each other. In one embodiment, the domain knowledge is created or maintained by a single source or controlling authority.

It will be appreciated that while the subject matter described herein is illustrated with a management system and a NE, other situations and usages are contemplated for a validation framework. For example, the present subject matter is useful and advantageous in any application where one entity needs to be aware of a second entity's domain knowledge, such as for interacting with and/or presenting information about the second entity. For example, the subject matter described herein may be used anywhere a "front-end" (e.g., a graphical user interface, or GUI), is developed separately from its "back-end" (e.g., a program or system that processes input and returns output to the "front-end"). According to an embodiment of the subject matter described herein, a validation framework is provided for efficiently and effectively communicating with and/or presenting information about a NE.

Figure 2:
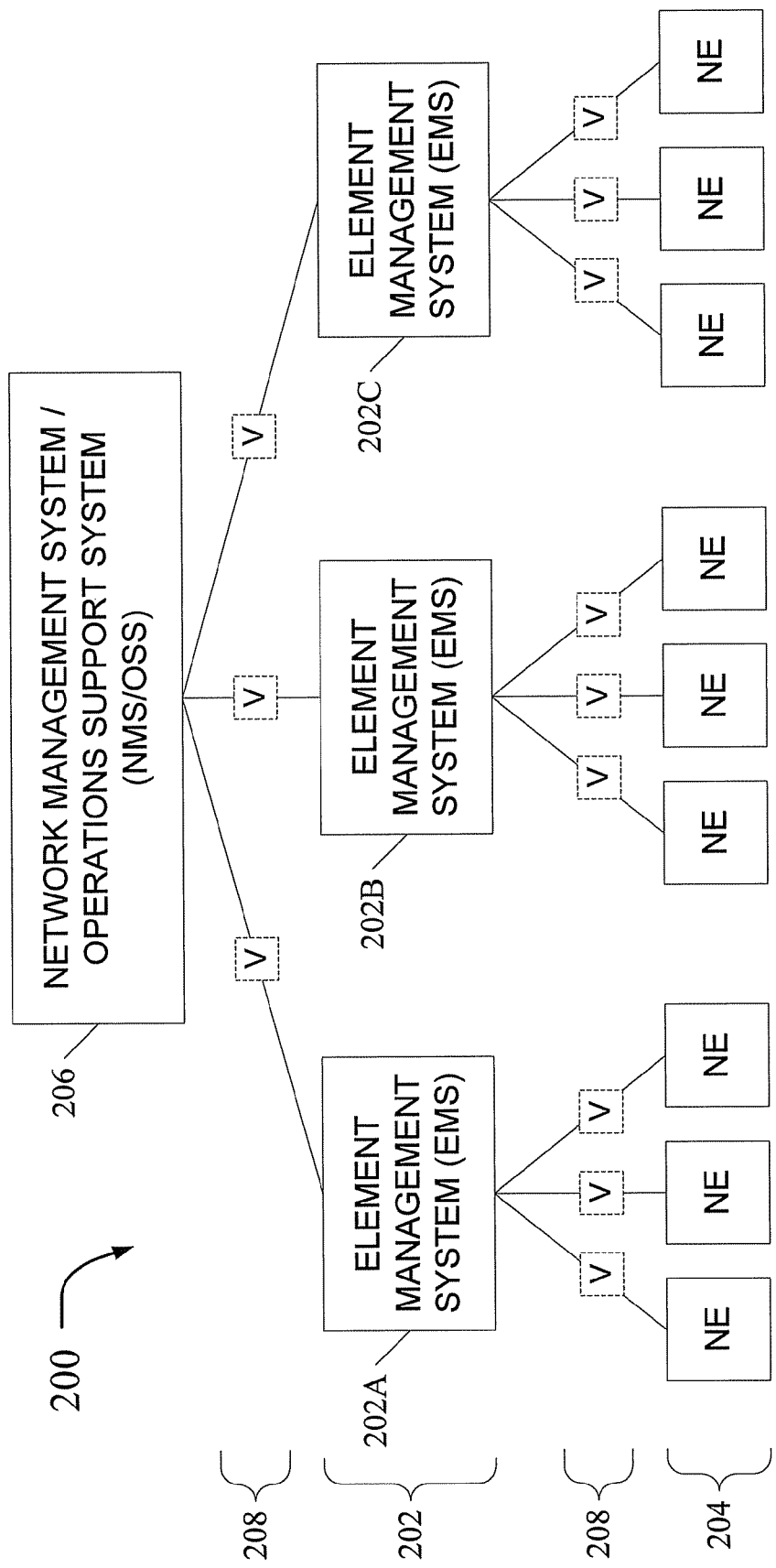
FIG. 2 illustrates an exemplary validation framework for element management systems and network element systems according to an embodiment of the subject matter described herein.

FIG. 2 illustrates an exemplary validation framework for element management systems and network element systems according to an embodiment of the subject matter described herein. In one embodiment, system 200 includes one or more element management systems 202, each of which may control and monitor one or more network elements 204. A network management system or operations support system (NMS/OSS) 206 may monitor one or more of the EMSs 202.

System 200 includes one or more instances of validation logic (V) 208 that validates messages and information passing between NMS/OSS 206 and one or more EMSs 202, between each EMS 202 and one or more of the network elements 204 controlled by the particular EMS 202, or some combination of the above. In FIG. 2, validation logic 208 is represented as a dotted box positioned on the communication path between two nodes, such as between NMS/OSS 206 and EMS 202A, between EMS 202B and an NE 204, etc., but in actual implementation, validation logic 208 may be contained within either or both of the nodes that are connected by the communication path. For example, in the embodiment illustrated in FIG. 2, validation logic may be located in an NE 204, in an EMS 202, in NMS/OSS 206, or some combination of the above. Alternatively, validation logic 208 may reside exclusively within each EMS 202, and not on NMS/OSS 206 nor within any NE 204. Other configurations or divisions of labor are contemplated. Likewise, validation logic 208 may exist solely on one or the other of two nodes connected by a communication path. Alternatively, the functions, structures, or modules of validation logic 208 may be distributed or shared between the two nodes that are communicating with each other.

Figure 3:
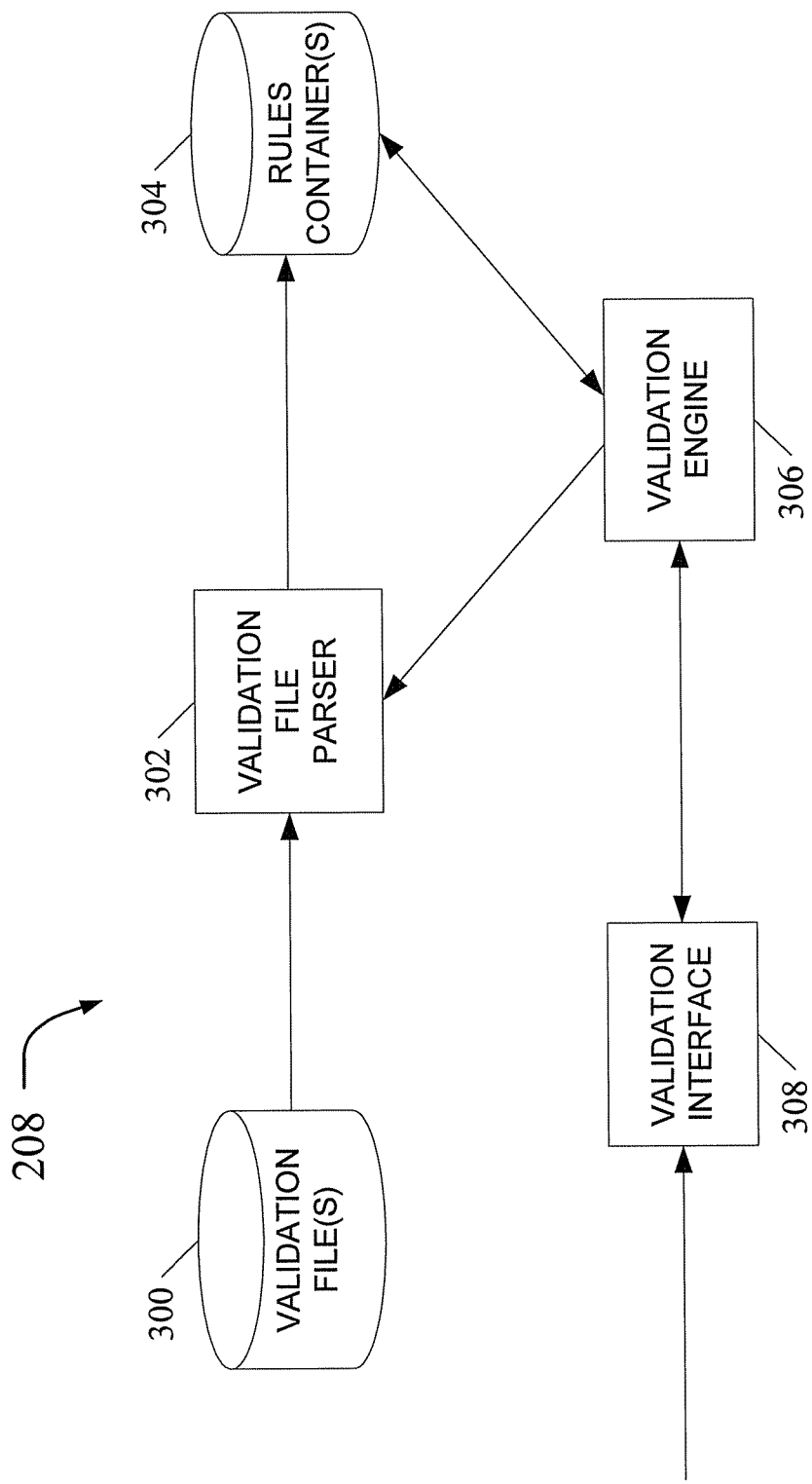
FIG. 3 is a block diagram of validation logic according to an embodiment of the subject matter described herein.

FIG. 3 is a block diagram of validation logic 208 according to an embodiment of the subject matter described herein. It will be appreciated that validation logic 208 may include additional, fewer, or different components for validating data and/or presentation intelligence. Referring to FIG. 3, validation logic 208 may include one or more validation configuration files 300, a file parser 302, one or more rules containers 304, a validation engine 306, and a validation interface 308.

In one embodiment, validation configuration files 300 include domain knowledge in the form of information for implementing or providing data validation logic. Referring back to the example illustrated in FIG. 2, a developer or development team for one of network elements 204 may develop or use domain knowledge that is particular to their NE. The NE development team may create or compile information related to this domain knowledge for validating input and/or presenting information about the NE. This information may be provided, e.g., as a validation configuration file, to one or more interacting entities or receivers. In one embodiment, validation configuration files may be distributed automatically to interacting or potential interacting entities. Interacting entities (i.e., entities that may interact with the NE) may include humans and computers. Since the domain knowledge, or the information related to the domain knowledge, is provided by a single entity, i.e., the NE development team, this information is said to be from a single source, and is thus known as "single-sourced" information.

The concept of providing a single source for domain information for each NE may be extended to a higher level, in which all validation configuration files 300 may originate from, or be maintained by, a single source or single controlling authority. Such an embodiment is herein referred to as a "single-sourced validation framework." In a single-sourced validation framework, a first entity does not need to independently determine domain knowledge of a second entity, which is typically accomplished through integration and system tests, but instead may use some information from a single source (e.g., from the second entity's developers) to develop data validation logic for interacting with the second entity. Thus, a single-sourced validation framework may provide domain knowledge that is derived, created, or compiled by or from one source.

In one embodiment, one or more validation configuration files 300 may be maintained or stored local to the validating entity (e.g., in random access memory (RAM) at the local system containing validation logic 208). Additionally, one or more validation configuration files 300 may be maintained or stored remotely from the validating entity (e.g., a remote system or a remote database). In one embodiment, each validation configuration file 300 may be derived, created, or compiled by or from one source (e.g., a developer or development team of an NE). Each validation configuration file 300 may include domain knowledge information for a system or subsystem (e.g., network element) and/or a version of a system or subsystem. For example, validation configuration files 300 may be any suitable format including a text or human-readable format. In one embodiment, validation configuration file 300 may be in a markup language format, such as extensible markup language (XML).

In one embodiment, validation configuration files may include one or more rules. Each rule may include a trigger condition and a dependent action. A trigger condition includes any conditional expression (i.e., a condition that may be true or false) for initiating one or more dependent actions. For example, a conditional expression may be whether a subsystem or element page of an EMS GUI is being requested, whether a parameter or field value is equal to '0', or whether a checkbox is selected. A dependent action may be any action performed in response to a trigger condition being triggered (i.e., any outcome of a conditional expression that initiates or should initiate one or more dependent actions). A sample rule is shown below in an XML format with triggers and conditions in written sentences for illustrative purposes:

---

SAMPLE RULE #1

<triggerCondition name="Trigger1">
   Is GUI user requesting Card 3's configuration page?
</triggerCondition>
<depAction ruleId="Action1">
   <triggerCondition> "Trigger1" </triggerCondition>
   Show only the parameters capable of being configured by
   GUI user.
</depAction>

---

File parser 302 represents a component for parsing validation configuration files 300 into data validation logic (i.e., rules). In one embodiment, file parser 302 may also convert validation configuration files 300 into a machine- or system-usable format (e.g., a binary format, byte code, machine code). File parser 302 may also store the logic or rules derived from the one or more validation configuration files 300 in one or more rules containers 304. Rules container 304 represents a repository of logic or rules information. In one embodiment, one or more rules containers 304 may be maintained locally. For example, a rules container 304 may be maintained or stored in a local computer-readable storage medium, such as random access memory (RAM). Additionally, one or more rules containers 304 may be maintained or stored remotely (e.g., a remote system or a remote database).

In one embodiment, rules container 304 may contain rules information from one or more validation configuration files 300 related to a particular system or subsystem and/or a particular version of a particular system or subsystem. For example, validation logic 208 may include a rule container 304 for each subsystem (e.g., network element) or system and/or a rule container 304 for each version of a subsystem or system. It will be appreciated that such determining, selecting, accessing, and loading/applying validation configuration files 300 and/or rules container 304 may occur at runtime.

In one embodiment, rules container 304 may maintain two data sets. The first data set may contain conditional expressions (i.e., trigger conditions) indexed by trigger condition identifiers. The second data set may contain dependent actions indexed by the trigger condition identifiers. In one embodiment, the collection of rule information in the first or second data set may be ordered using one or more criteria including the order in which rules are to be applied.

Validation engine 306 represents a component for providing data validation. In one embodiment, data validation may include validating input received from validation interface 308 and/or providing presentation intelligence to validation interface 308. Validation engine 306 may receive input from (e.g., a trigger condition identifier and trigger value) and provide output to (e.g., actions to be performed based on rules) validation interface 308. Validation engine 306 may be responsible for initializing appropriate rules. For example, validation engine 306 may use an identifier (e.g., a subsystem identifier) provided by validation interface 308 to select appropriate rules. In one embodiment, validation engine 306 may use rules (e.g., from a rules container 304) to determine and select actions to be performed. These actions may be provided to validation interface 308.

Validation interface 308 represents any component (e.g., a GUI or CLI) or object that needs data validation logic (i.e., any object that needs to use the rules). Validation interface 308 is responsible for interfacing with validation engine 306, including providing and/or resolving data for validation into a format understood by validation engine 306. In one embodiment, validation interface 308 may be an interface or associated with an interface for receiving input. Validation interface 308 may receive input (e.g., originating from a third party application). In one embodiment, validation interface 308 may send all input to validation engine 306. In this embodiment, validation engine 306 may determine whether a trigger condition has been triggered. In another embodiment, validation interface 308 may determine when a trigger condition has been triggered (e.g., using information from rules containers 304). In this embodiment, validation interface 308 invokes validation engine 306 by sending information about a trigger condition when the trigger condition has been triggered.

The operation of validation logic 208 will now be described in more detail. In one embodiment, invoking validation engine 306 may include initializing the validation engine 306 with rules for a particular system or subsystem (e.g., network element) and/or a particular version of the particular system or subsystem. Validation interface 308 may provide an identifier (e.g., a subsystem identifier) for initializing the validation engine 306. This process is illustrated in FIG. 4.

Figure 4:
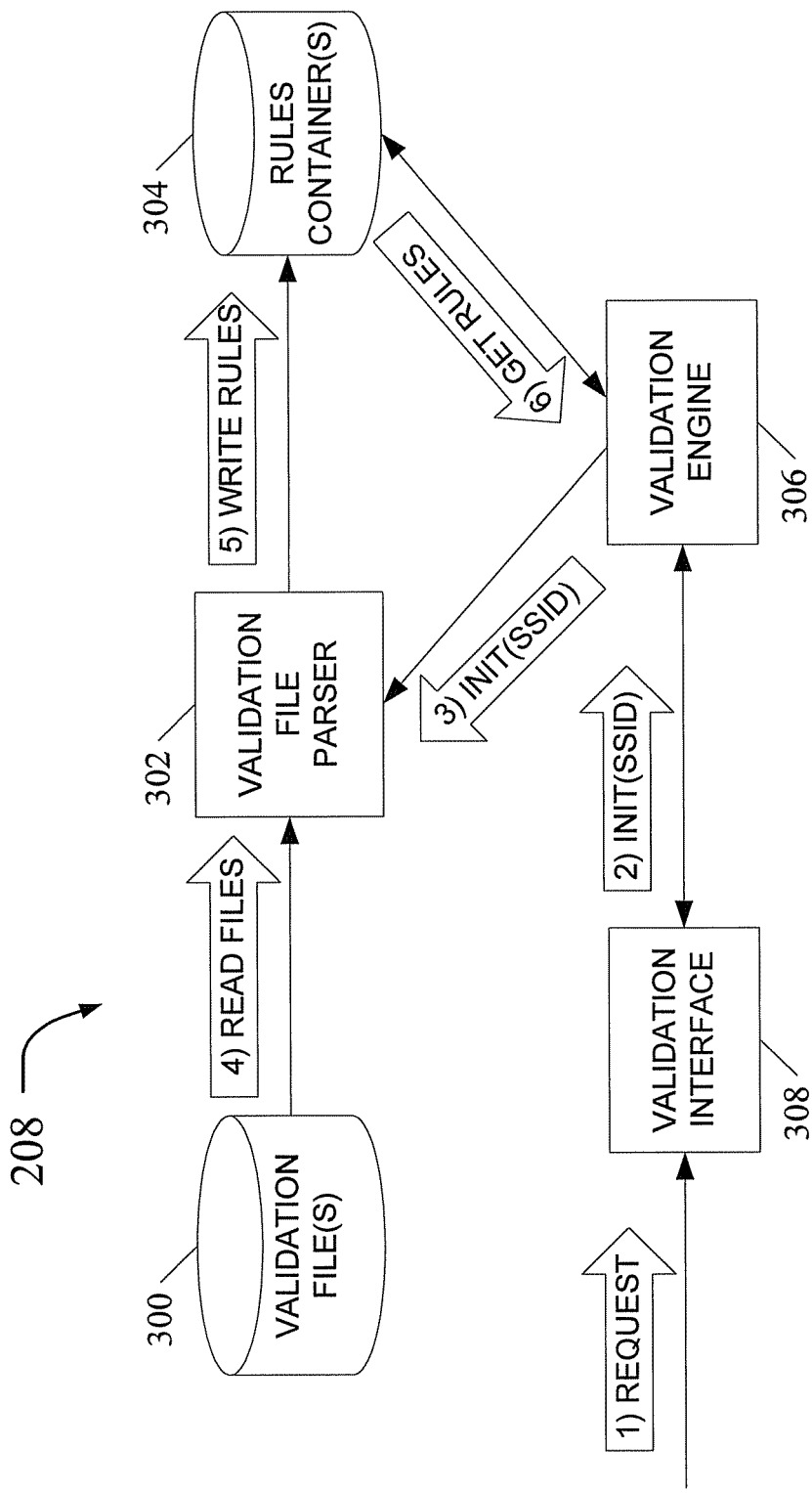
FIG. 4 is a block diagram of validation logic illustrating initialization according to an embodiment of the subject matter described herein.

FIG. 4 is a block diagram of validation logic 208 of FIG. 2 illustrating initialization according to an embodiment of the subject matter described herein. In this embodiment, validation interface 308 receives some data, e.g., a request to display a configuration page in an EMS GUI or a request to change a configuration parameter of a NE (FIG. 4, message 1). Validation interface 308 determines validation engine 306 is not initialized and/or not loaded with appropriate rules information. Validation interface 308 issues an initialize command (FIG. 4, message 2) so that the validation engine 306 may be initialized and/or load the appropriate files. In one embodiment, initialization may include providing one or more validation configuration files 300 across a plurality of systems. For example, an NE may provide or send a validation configuration file 300 to each management system with which the NE interacts either directly (e.g., an EMS server) or indirectly (e.g., an NMS/OSS). In one embodiment, the command may include an identifier to identify the rules of a particular system or subsystem (e.g., a network element). Additionally, the identifier may include information to identify rules for a particular version of a system or subsystem and/or a particular form of such rules.

Validation engine 306 may use the identifier and/or other information (e.g., a trigger condition identifier) to select appropriate rules containers 304 for data validation. In one embodiment, if appropriate rules containers 304 are not created or available, validation engine 306 may issue an initialize command to file parser 302 (FIG. 4, message 3). In this embodiment, the initialize command may include an identifier for determining and selecting one or more appropriate validation configuration files 300 for processing. This identifier may identify the validation configuration files of a particular system or subsystem (e.g., a network element). Additionally, the identifier may include information to identify validation configuration files for a particular version of a system or subsystem and/or a particular form of such files. File parser 302 may read or retrieve one or more validation configuration files 300 (FIG. 4, message 4), and write rules to one or more rules containers 304 (FIG. 4, message 5), generating rules containers 304 as needed. Validation engine 306 may then access the rules in rules containers 304 (FIG. 4, message 6) and use the rules for data validation.

In one embodiment, validation interface 308 may also provide validation engine 306 with information to resolve which rules to use and which dependent actions should apply. For example, when rules are needed (e.g., when a trigger condition is triggered), validation interface 308 may provide a trigger condition identifier to validation engine 306. Validation interface 308 may also provide validation engine 306 with additional information (e.g., a trigger value) to resolve which dependent action should be performed. Validation interface 308 may receive, provide, and/or implement one or more actions determined by the validation engine 306. This process is illustrated in FIG. 5.

Figure 5:
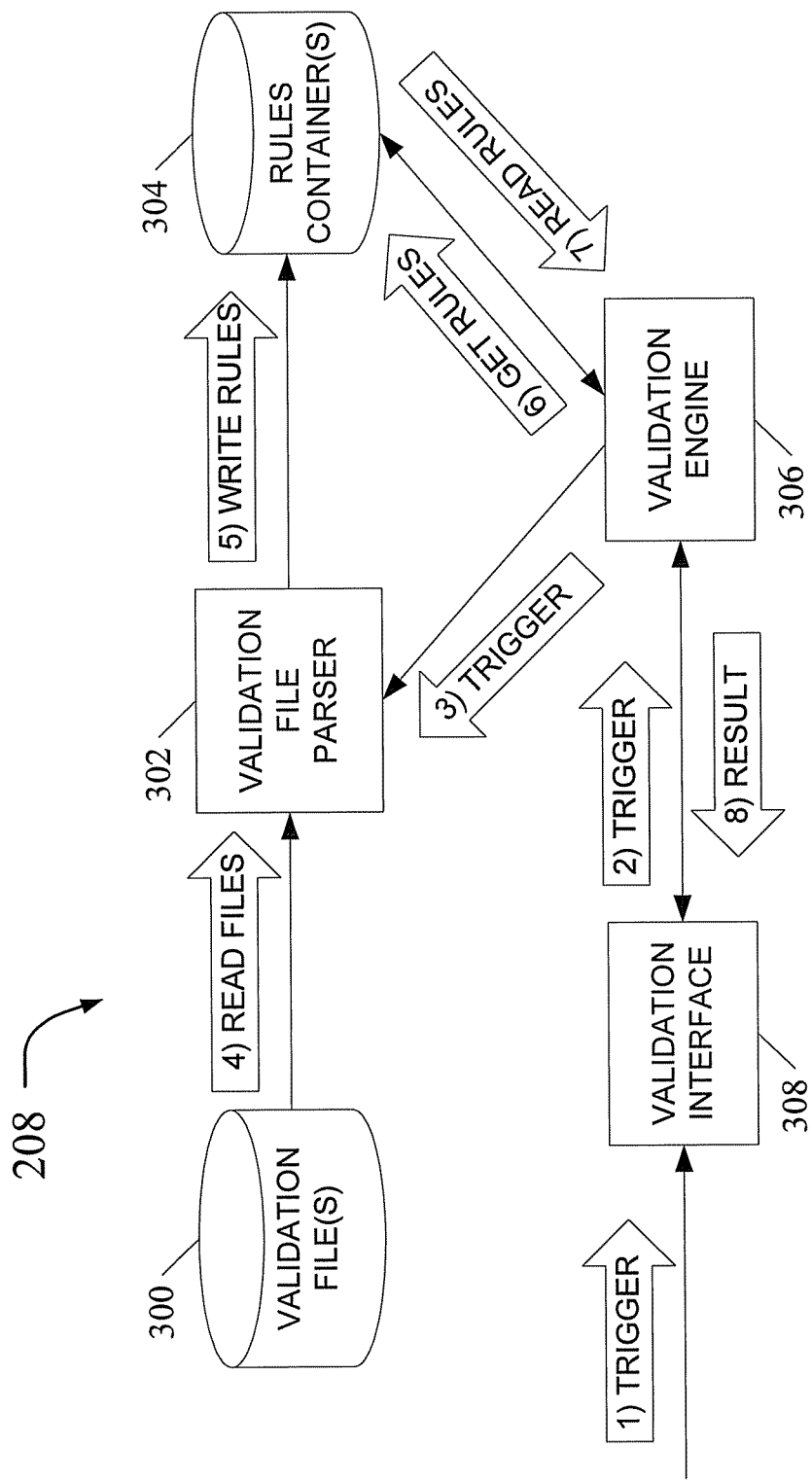
FIG. 5 is a block diagram of validation logic illustrating response to a trigger condition according to an embodiment of the subject matter described herein.

FIG. 5 is a block diagram of validation logic 208 of FIG. 2 illustrating response to a trigger condition according to an embodiment of the subject matter described herein. In this embodiment, data validation or some portion thereof occurs at runtime (e.g., when the validation module is running). Validation interface 308 receives data (e.g., user input), which triggers the validation process (FIG. 5, message 1). Validation interface 308 may provide the data or some information related to the data to validation engine 306 (FIG. 5, message 2). In one embodiment, validation interface 308 invokes validation engine 306 only when a trigger condition is triggered. As stated above, the term triggered is used when a trigger condition initiates or should initiates a dependent action. Validation interface 308 may pass triggering information (e.g., a trigger condition identifier) as a parameter to validation engine 306 (FIG. 5, message 2).

Validation engine 306 may use information provided by validation interface 308 for obtaining and applying appropriate rules. If appropriate rules containers 304 are not available, validation engine 306 may send a command (FIG. 5, message 3) to instruct file parser 302 to retrieve the required validation files 300 (FIG. 5, message 4). File parser 302 may select one or more appropriate validation configuration files 300 (e.g., using the subsystem identifier) and convert them into appropriate rules containers 304 (FIG. 5, message 5). Validation engine 306 may then issue a request (FIG. 5, message 6) to get the appropriate rules from rules containers 304 (FIG. 5, message 7). For example, validation engine 306 may get rules for a particular subsystem stored in one or more appropriate rules containers 304 using a subsystem identifier. If the appropriate rules already existed in rules containers 304, messages 3, 4, and 5 of FIG. 5 would not be necessary and thus would not be issued.

In one embodiment, validation engine 306 may use the rules information contained in the rules containers 304 for evaluating or checking data, such as user input. In one embodiment, a validating entity (e.g., EMS) using validation logic 208 may perform data validation for different NE releases or versions if there are appropriate validation configuration files available for the different versions. In another embodiment, validation engine 306 may use triggering information provided by validation interface 308, such as a trigger condition identifier, a trigger value, and a trigger value type, for determining an appropriate dependent action.

The result of the validation process is then sent from validation engine 306 to validation interface 308 (FIG. 5, message 8). Validation of configuration commands sent from one entity to another may be implemented in a variety of ways. In situations where a user (in this case, a human operator) performs configuration of a network element via an application which presents configuration options to the user via a graphic user interface (GUI), one approach is to allow the user to enter configuration data without constraint. The application then validates the entered data (e.g., checks for valid values) and reports any invalid value to the user, usually with the option to correct the value and retry. This is referred to herein as "simple validation", and is illustrated in FIGS. 6A and 6B.

Figure 6A:
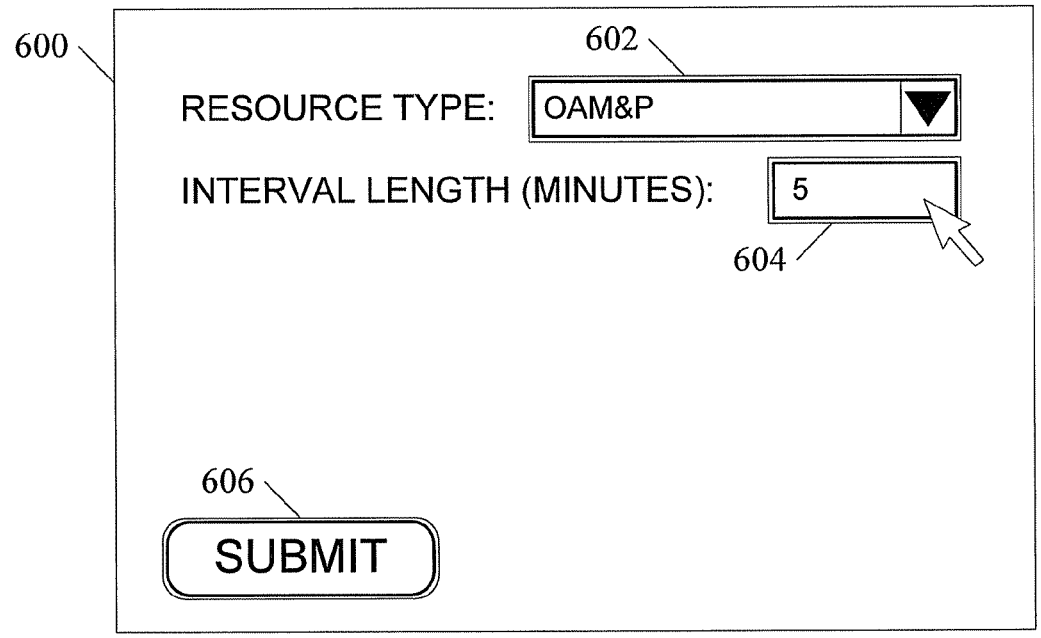
FIGS. 6A and 6B illustrate an exemplary graphic user interface (GUI) implementing simple validation according an embodiment of the subject matter described herein.
Figure 6B:
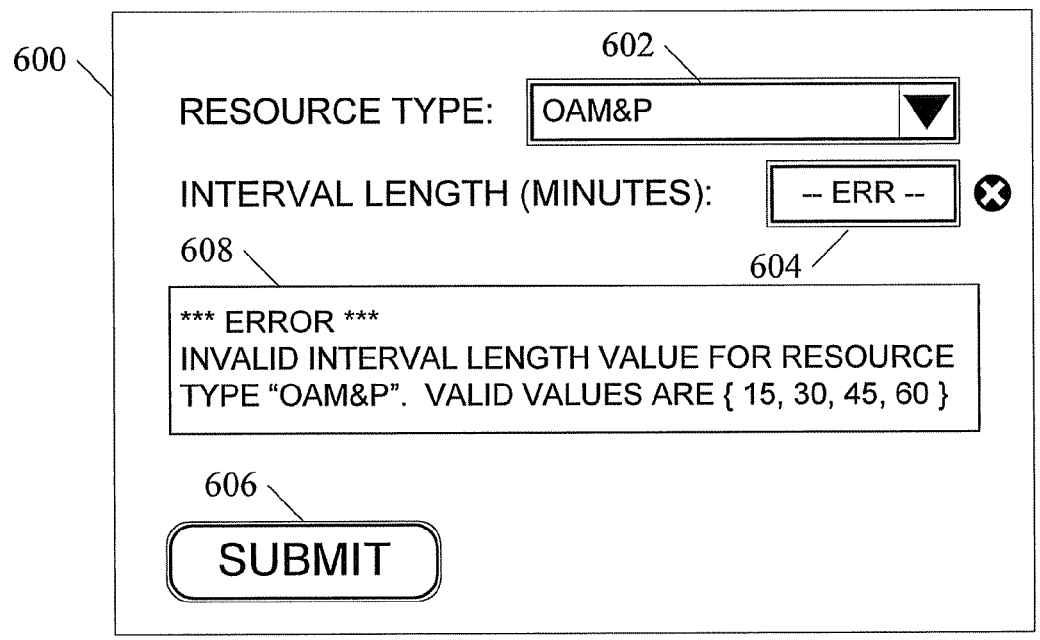

FIGS. 6A and 6B illustrate an exemplary graphic user interface (GUI) 600 implementing simple validation according an embodiment of the subject matter described herein. In the embodiment illustrated in FIG. 6A, GUI 600 includes a selection box, Resource Type 602, which allows a user to choose a resource type, and a text input box, Interval Length 604, which allows the user to enter a number representing an interval length in minutes, e.g., how often to send a handshaking signal. A submit button 606 submits the values of Resource Type 602 and Interval Length 604 to validation engine 306 for validation and other processing. FIG. 6B shows the result of the validation: an error message 608 is now displayed on GUI 600, indicating that the interval length entered by the user is not a valid value, and informing the user that valid values are 15, 30, 45, and 60 minutes.

Another, more sophisticated approach is to use the validation information to proactively restrain or restrict what the user can enter, so as to guarantee valid data entry. For example, the display itself may change based on the type of network entity being configured: contents of selection boxes may vary, select buttons may be made invisible or unavailable for selection, and so on. This modification of the options presented to a user is commonly referred to as "presentation intelligence". An example of presentation intelligence is shown in FIGS. 6C and 6D.

Figure 6C:
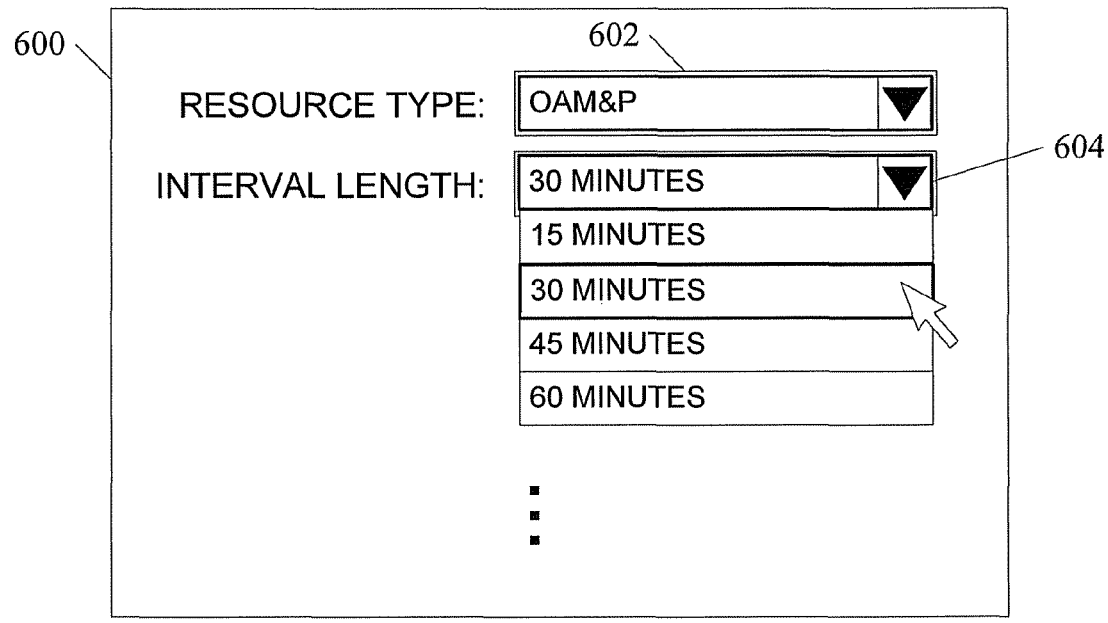
FIGS. 6C and 6D illustrate an exemplary graphic user interface (GUI) implementing presentation intelligence according an embodiment of the subject matter described herein.
Figure 6D:
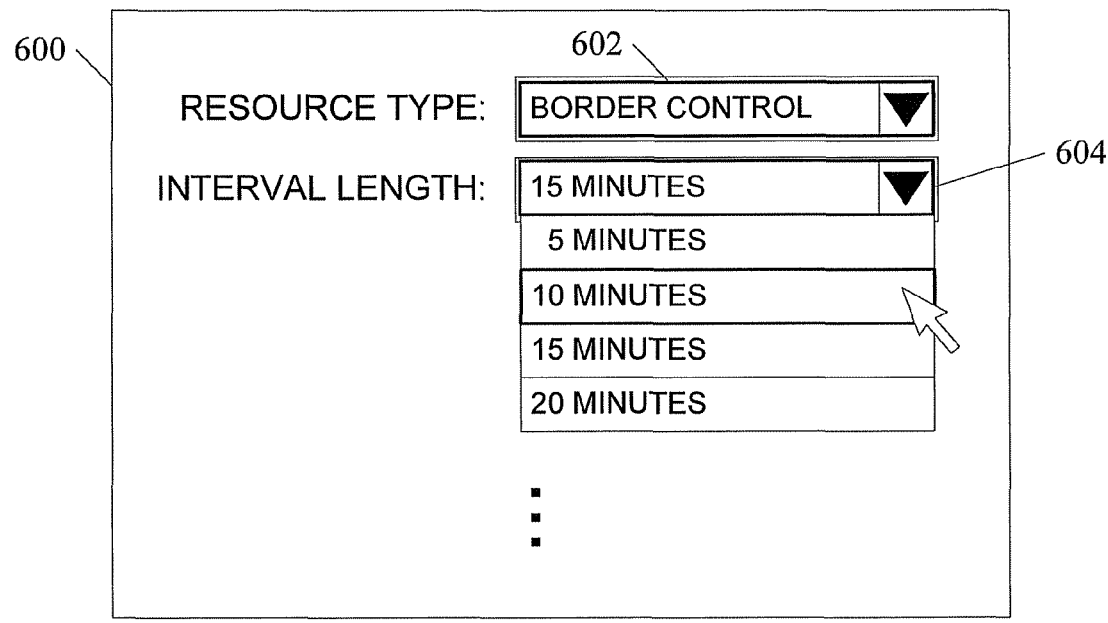

FIGS. 6C and 6D illustrate an exemplary graphic user interface (GUI) 600 implementing presentation intelligence according an embodiment of the subject matter described herein. In the embodiment illustrated in FIG. 6C, simple text input field Interval Length 604 has been replaced with a selection box of the same name, which constrains the user to choose a valid interval length of 15, 20, 45, or 60 minutes. FIG. 6D illustrates how the contents of Interval Length 604 change when another Resource Type 602 has been selected. In FIG. 6C, the resource type was an operations, administration, maintenance, and provisioning (OAM&P) network element. In contrast, in FIG. 6D, a border control element has been selected; here, the valid interval lengths listed in Interval Length 604 are values that are valid for this resource type—namely, 5, 10, 15, and 20 minutes.

Thus, presentation intelligence may generally be defined as functionality for presenting relevant and accurate information about a given entity. For example, a user interface with presentation intelligence may present information based on a user's selection. That is, a network administrator selects a particular NE for configuring in an EMS GUI, this selection information may be used by a validation module to determine which configuration parameters are available and modifiable for the particular NE. Based on the determination, the validation module may inform the GUI which parameters should be shown, hidden, or made un-modifiable (i.e., "grayed out"). Additionally, presentation intelligence may be used in allowing only valid values to be selectable options. For example, presentation intelligence may be used in informing a GUI to provide values 1-10 in drop down list for an active media card parameter if there are only 10 media cards available in the NE. Furthermore, if a parameter requires an integer as a value, presentation intelligence may be used in preventing any character that is not an integer (e.g., "a," "?," and ".") from being entered (e.g., in a GUI input box).

Presentation intelligence may also be used with other interfaces, such as a command line interface (CLI). For example, a network administrator may attempt to configure a particular parameter of a network element with the value '5' using a CLI update command. A validation module may determine whether the value '5' is valid for the particular parameter of the network element. If the new value is determined to be invalid, presentation intelligence may include providing examples of valid input. For example, the user may be informed that '5' is not a valid value for a given field or parameter but '1-4' are valid values. Thus, presentation intelligence may include adding, deleting, changing, or preventing changes to information when a particular option is selected (e.g., in a GUI) or a particular value is entered (e.g., at a command line interface).

Thus, validation logic 208 may enable GUI 600 to determine and provide appropriate options for Interval Length 604 based on selected resource type in Resource Type 602. In one embodiment, validation logic 208 is based on an appropriate validation configuration file 300 to determine and provide the appropriate options for Interval Length 604.

As stated above, rules container 304 may contain two data sets for storing rules information. Each data set may include logical parts of one or more rules. That is, one data set may include, for each rule, a trigger condition identifier mapped to a trigger condition (i.e., a conditional expression). The second data set may include, for each rule, a trigger condition identifier mapped to one or more dependent actions. In one embodiment, each dependent action may be performed on one or more targets.

As used herein, the term "target" may refer to any field, value, component, or other aspect of a system or interface (e.g., GUI) on which an action may be performed. For example, the target may be a user interface and the action may include providing output to the interface (e.g., "Input is invalid. Valid Values for <FIELD> are 'A', 'B', 'C', and D'"). In another example, the target may be an EMS server and the action may include updating the server. In yet another example, the target may include a parameter or field value and the action may include a trigger condition being triggered. Thus, in this example, a trigger condition may result in one or more trigger conditions being triggered (i.e., a chain of trigger conditions).

In one embodiment, validation engine 306 queries the validation interface 308 for the trigger value (e.g., a value to be used in a conditional expression) and or a target value (e.g., a value of a target). Validation engine 306 may expect or request the value to be in a particular or appropriate type (e.g., an integer, text, double, integer set, or Boolean). In one embodiment, an appropriate type may be defined or implied by the rule or conditional expression being evaluated. Validation interface 308 may include a value parser component (not depicted in FIG. 4) for parsing the trigger value (e.g., an input value) into an appropriate type or format. Validation interface 308 may provide the input value as an appropriate type to validation engine 306. Validation engine 306 may compare or evaluate the trigger value with the conditional expression (i.e., the trigger condition). Additionally, validation engine 306 may compare or evaluate the target value with the action to be performed (i.e., the dependent action) to determine if the action needs to be performed.

In one embodiment, validation engine 306 performs at least one action in response to the comparison or evaluation. Typically, the action performed or selected to be performed depends on whether the conditional expression is true or false. In one embodiment, the action performed by validation engine 306 may include providing information to validation interface 308. For example, validation engine 306 may simply inform validation interface 308 of the results of the evaluation. Additionally, validation engine 306 may inform validation interface 308 of actions validation interface 308 is to perform. For example, a GUI may be validation interface 308 and, as such, may be responsible for providing output as determined by validation engine 306 (i.e., presentation intelligence). It will also be appreciated that a dependent action may result in a trigger condition being triggered. Thus, this dependent action may be implemented by validation engine 306. Validation engine 306 may also function as a validation interface 308 in this situation.

As stated above, a validation module may be created or configured to use single-sourced information to implement or provide data validation logic. According to an embodiment of the subject matter described herein, a validation module may be employed at a plurality of different systems, such as an NE server, an EMS GUI client, and an EMS server. At each validation module, single-sourced information may be received and converted into a computer-readable and/or system-specific format, such as computer-executable validation logic or rules. In one embodiment, selecting, accessing, or converting single-sourced information may occur at, during, or in run-time. Using the validation rules created from the single-sourced information, input and output may be checked or evaluated for validity. Thus, the subject matter described herein may minimize interface exchanges between systems, provide standardized system responses including standardized system errors, and minimize the use or need of hard-coded or static validation logic.

The domain knowledge provided by the validation framework may also be used in other ways. For example, the single-sourced information may be provided to additional development teams, such as other NE developers, management system developers, or other interested parties, such as service providers and customers, who may use the domain knowledge as a guide to ensure that their products that are currently under development will correctly interoperate with other developer's products.

An exemplary XML format for a validation configuration file 300 will now be described. It will be appreciated that different styles, formats, languages, labeling conventions, and the like may be used to provide, store, or inform others of rules information. For example, single-sourced rules information may be described using an XML format and may be stored in a validation configuration file 300. The XML format used for validation configuration file 300 may include different tags and attributes. Table 1, below, includes examples of different attributes and tag that may be used in one exemplary XML validation configuration file 300 for providing rules information.

TABLE 1

Tags and Attributes for XML Format Describing Rules Information

| Attributes/Tag(s) | Description |
|---|---|
| <condition...> </condition> | This tag defines a trigger condition including attributes such as trigger field and triggering value of the trigger field. |
| cid="" | This trigger condition attribute uniquely identifies the trigger condition. |
| moType="" | This trigger condition attribute identifies the trigger condition by managed object type (e.g., a management information base (MIB) table for storing information about managed objects may be identified by moType). |
| groupTabTag="" | This trigger condition attribute identifies the trigger condition by its group or tab name (e.g., within a MIB table). |
| * | This keyword indicates a wild card replacement. |
| trigger="" | This trigger condition attribute identifies the trigger condition by its field name (e.g., within a MIB table) |
| value="" | This trigger condition attribute indicates the value of trigger condition. |
| valueType="" | This trigger condition attribute indicates the type or format of the trigger condition value (e.g., a valueType = "Integer" should be any negative or positive whole number while a valueType = "Boolean" should be True or False). |
| operation="" | This trigger condition attribute indicates the logical comparator operation for comparing or evaluating the value of the trigger condition (e.g., "==" is equals). |
| <rule...> </rule> | This tag defines a dependent action condition including attributes such as dependent fields or targets and dependent actions to be performed on the targets depending whether the trigger condition is true or false. |
| ruleid="" | This dependent action condition attribute uniquely identifies the dependent action condition. |
| moType="" | This dependent action condition attribute identifies the target by managed object type (e.g., a management information base (MIB) table may be identified by moType). |
| groupTabTag="" | This dependent action condition attribute identifies target by its group or tab name (e.g., within a MIB table). |
| <dependent...> </dependent> | This dependent action condition attribute identifies the dependent action by field (e.g., within a MIB table or in a GUI). |
| <action...> </action> | This action tag defines an action to be performed when a trigger condition is met. |
| <revAction...> </revAction> | This action tag defines an action to be performed when an action is reversed or when a trigger condition is false. A revAction may be defined when an <action> tag has a reversible="yes" attribute. |
| actionId="" | This dependent action attribute indicates the action or type of action to be performed (e.g., "set_value," "valid_values," "server_update," "make_visible") |
| param="" | This dependent action condition attribute indicates the parameters for a given action or revAction. Parameters may include a variety of things including numbers and program functions. |
| reversible="" | This dependent action condition attribute indicates whether there the action is reversible. |
| <triggerCondition...> </triggercondition> | This dependent action condition tag includes a trigger condition identifier (i.e., a cid) which identifies the trigger condition that invokes the dependent action condition. |

An example of a rule for data validation including providing presentation intelligence for GUI 600 is shown below:

SAMPLE RULE #2

```
<condition CID="IsNotBorderControl"
    moType="PERF_CONTROL"
    groupTabTag="*"
    trigger="ResourceType"
    value="BORDER CONTROL"
    valueType="Text"
    operation="!=">
```

-continued

SAMPLE RULE #2

```
</condition>
<rule ruleId="rIntervalLength"
    moType="PERF_CONTROL"
    groupTabTag="*" >
    <dependent>
        INTERVAL
    </dependent>
    <action actionId="VALID_VALUES"
        reversible="yes"
        param="15,30,45,60">
```

-continued

SAMPLE RULE #2

```
        </action>
        <revAction actionId="VALID_VALUES"
            param="5,10,15,20">
        </revAction>
        <triggerCondition>
            IsNotBorderControl
        </triggerCondition>
</rule>
```

The rule is in an XML format using the tag and attribute convention of Table 1, above. As can be seen above, a validation rule may be separated into parts, such as a trigger condition and a dependent action condition. A trigger condition may include a trigger condition identifier (CID), one or more trigger field identifiers (e.g., moType, groupTabTag, and trigger attributes), a trigger value, a trigger value type, and a logical comparator operation. In Table 3, a trigger condition uniquely identified as "IsNotBorderControl" is defined. Trigger condition "IsNotBorderControl" occurs when a trigger field identified as "ResourceType" contains a "Text" value that does not equal "BORDER CONTROL".

As explained in Table 1, above, trigger field identifiers may be used to identify a specific MIB table, group, and field containing the triggering information. In one embodiment, validation interface 308 may be responsible for providing and resolving this information. For example, in FIGS. 6C and 6D, GUI 600 may be validation interface 308. As a validation interface 308, GUI 600 may resolve the field represented by Resource Type 602 into trigger field identifiers understood by validation engine 306. That is, GUI 600 may provide validation engine 306 with the location of the stored information (e.g., in a management information base (MIB) table) being displayed in Resource Type 602. In the FIGS. 6C and 6D, information in Resource Type 602 represents information stored in a MIB table identified by the trigger field identifiers of sample rule #2, above. Accordingly, the rule information described in sample rule #2 is triggered when the selected resource type in Resource Type 602 does not equal "BORDER CONTROL".

Sample rule #2 also includes a dependent action condition for the trigger condition identified as "IsNotBorderControl". A dependent action condition may include one or more trigger conditions, one or more target identifiers (e.g., moType and groupTabTag attributes and <dependent> tag), and one or more actions to be performed on targets. Similar to trigger field identifiers, target identifiers may be used to identify a target based on specific MIB table, group, and field where the target information is stored. In one embodiment, a validation interface 308 may be responsible for providing and resolving this information. For example, after validation engine 306 determines a target and an action to be performed on the target, validation engine 306 may send this target information to validation interface 308. In FIGS. 6C and 6D, GUI 600 may be validation interface 308. As validation interface 308, GUI 600 may resolve the target information and perform the action. That is, GUI 600 may determine that the target identifier represents the information in Interval Length 604 and perform one or more actions.

One or more actions may include a set of actions that need to be taken if the conditional expression results as true and another set of actions that need to be taken if the conditional expression results as false. In Table 3, a dependent action condition uniquely identified as "rIntervalLength" is defined. Dependent action condition "rIntervalLength" is invoked when trigger condition "IsNotBorderControl" is true and also when trigger condition "IsNotBorderControl" is false. That is, dependent field or target identified as "INTERVAL" (i.e., Interval Length 604) includes an action and revAction. Specifically, the action (occurring when trigger condition "IsNotBorderControl" is true) provides Interval Length 604 with a set of 3 options (param="15, 30, 45, 60"). The revAction (occurring when trigger condition "IsNotBorderControl" is not false) provides Interval Length 604 with a set of 4 options ((param="5, 10, 15, 20"). In FIG. 6C, trigger condition "IsNotBorderControl" is true (i.e., the selected value of Resource Type 602 is not "Border Control"). Therefore, Interval Length 604 includes only the options 15 minutes, 30 minutes, 45 minutes, and 60 minutes. In FIG. 6D, trigger condition "IsNotBorderControl" is false (i.e., the selected value of Resource Type 602 is "Border Control"). Therefore, Interval Length 604 includes the options 5 minutes, 10 minutes, 15 minutes, and 20 minutes.

Figure 7:
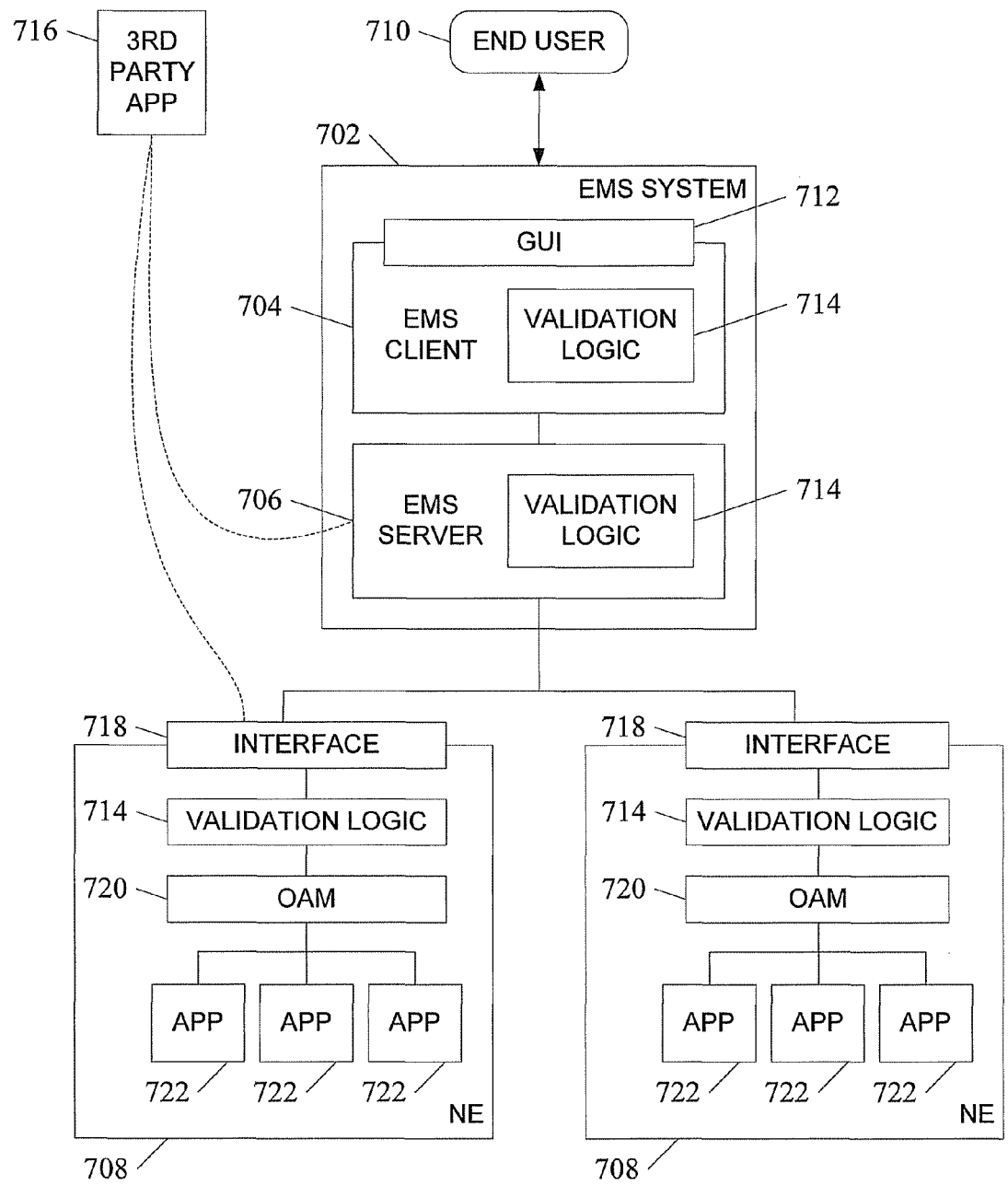
FIG. 7 is a schematic diagram of a system that includes an element management system node and two network elements that implement validation logic using a single-sourced validation framework according to an embodiment of the subject matter described herein.

FIG. 7 is a schematic diagram of a system that includes an element management system node and two network elements that implement validation logic using a single-sourced validation framework according to an embodiment of the subject matter described herein. It will be appreciated that the EMS and NEs depicted may contain additional and or different components for their respective functions.

In the embodiment illustrated in FIG. 7, system 700 includes an EMS system 702, which is comprised of an EMS client 704 and an EMS server 706, operating in a client/server configuration. EMS system 702 communicates with one or more network elements 708.

Figure 1:
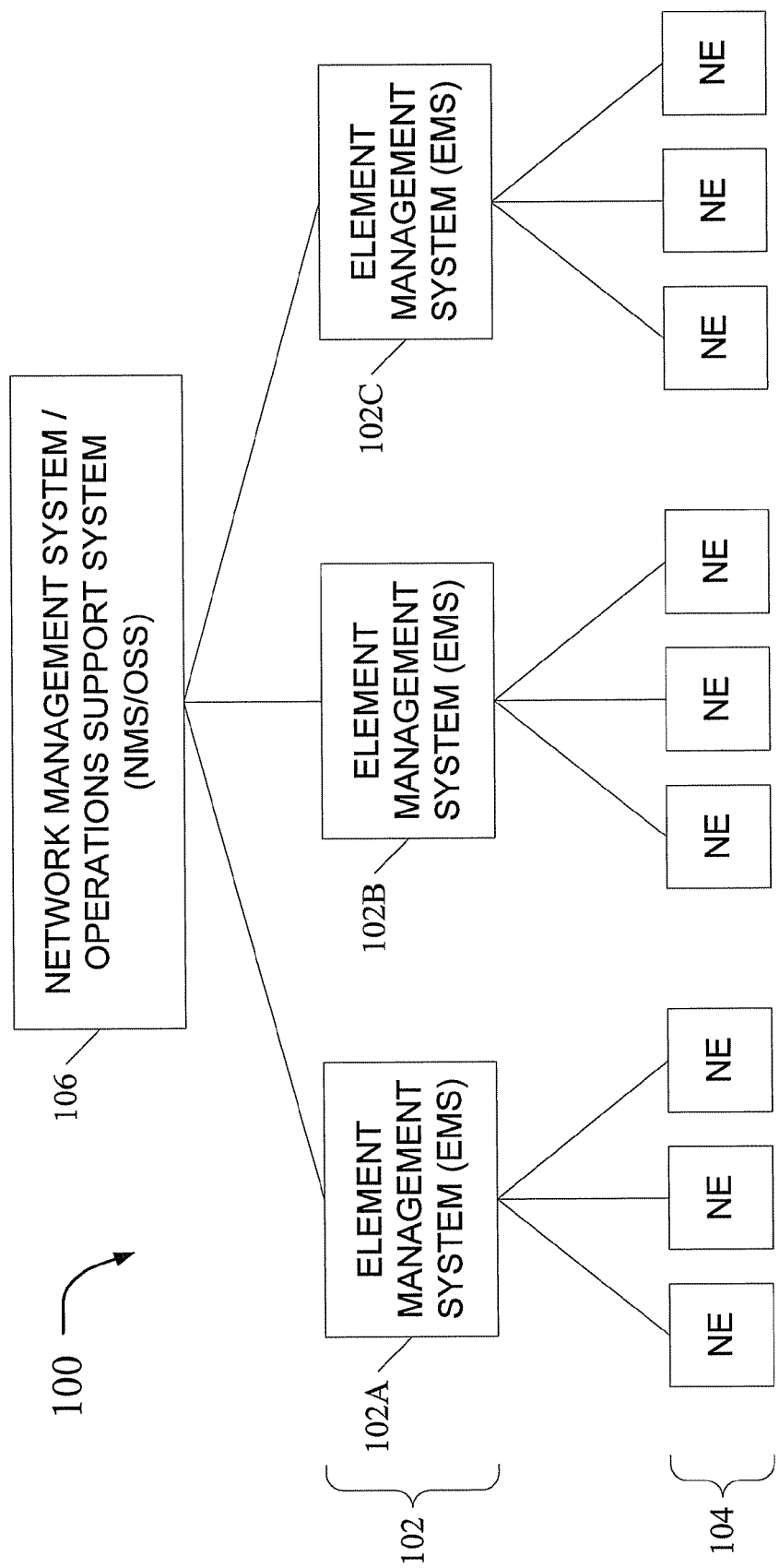
FIG. 1 illustrates one example of a conventional hierarchical management system.

EMS client 704 represents a computer or workstation for providing end user 710 access to EMS server 706. End user 710 may include any user of the EMS system 702, including a human user, a system, or a program. EMS client 704 includes a graphical user interface (GUI) 712 module for providing end users access to EMS function. While not depicted in FIG. 1, EMS client 704 may include other types of user interfaces, such as a command line interface (CLI) module for providing text input. System 700 incorporates validation logic 714, which is distributed throughout system 700. In the embodiment illustrated in FIG. 7, for example, EMS client 704, EMS server 706, and network elements 708 each implement at least some validation logic 714. In one embodiment, validation logic 714 may use information created, compiled, or derived by one source for data validation including validating input and providing presentation intelligence.

EMS server 706 represents a computer or system for controlling and managing one of more NEs 708. EMS server 706 may include such functionality as needed for NE management including functionality related to fault detection, performance monitoring, accounting, configuration, and security management (FCAPS). EMS server 706 may receive input from a variety of sources including EMS client 704 and third party applications 716 (e.g., NMS or OSS). While not depicted in FIG. 7, EMS server 706 may include one or more interfaces for interacting with the variety of input sources. These interfaces may use a one or more communication protocols including simple network management protocol (SNMP), transaction language 1 (TL1), premise distribution system (PDS), common management information service element (CMISE), common object request broker architecture (CORBA), and proprietary protocols.

In one embodiment, EMS server 706 may include one or more northbound interfaces for interacting with higher level management systems, such as an operations support system (OSS) or a network management system (NMS). EMS server 706 may also include one or more southbound interfaces for interacting with one of more NEs 708. EMS server 706 may include a validation logic 714. Validation logic 714 may validate input from the variety of sources that interact with EMS server 706. Validation logic 714 may also provide presentation intelligence to present relevant or accurate information about NEs 708 (e.g., through a CLI or other user interface).

NEs 708 represent network elements managed by EMS system 702. Each NE 708 includes an interface 718, validation logic 714, OAM 720, and element applications 722. Interface 718 represents functionality for interacting with programs, systems, and users including EMS server 706 and third party applications 722. Interface 718 may interact using one or more communication protocols including SNMP, TL1, PDS, CMISE, CORBA, and proprietary protocols. Validation logic 714 may validate input from the variety of sources that interact with NE 708. Validation logic 714 may also provide presentation intelligence including presenting relevant or accurate information about NEs 708 (e.g., through a CLI or other user interface).

OAM module 720 represents functionality for operating, administering, managing or maintaining the NE 708 and may also include provisioning the NE. In one embodiment, validation logic 714 processes input received through interface 718 before the input is received or used by the OAM module 720. OAM module 720 may use input to control or manage the NE 708 or control any element application 722. Element applications 722 represent any application running on NE 708. For example, if NE 708 is a media gateway, element applications 722 may be for managing media processing.

Figure 8:
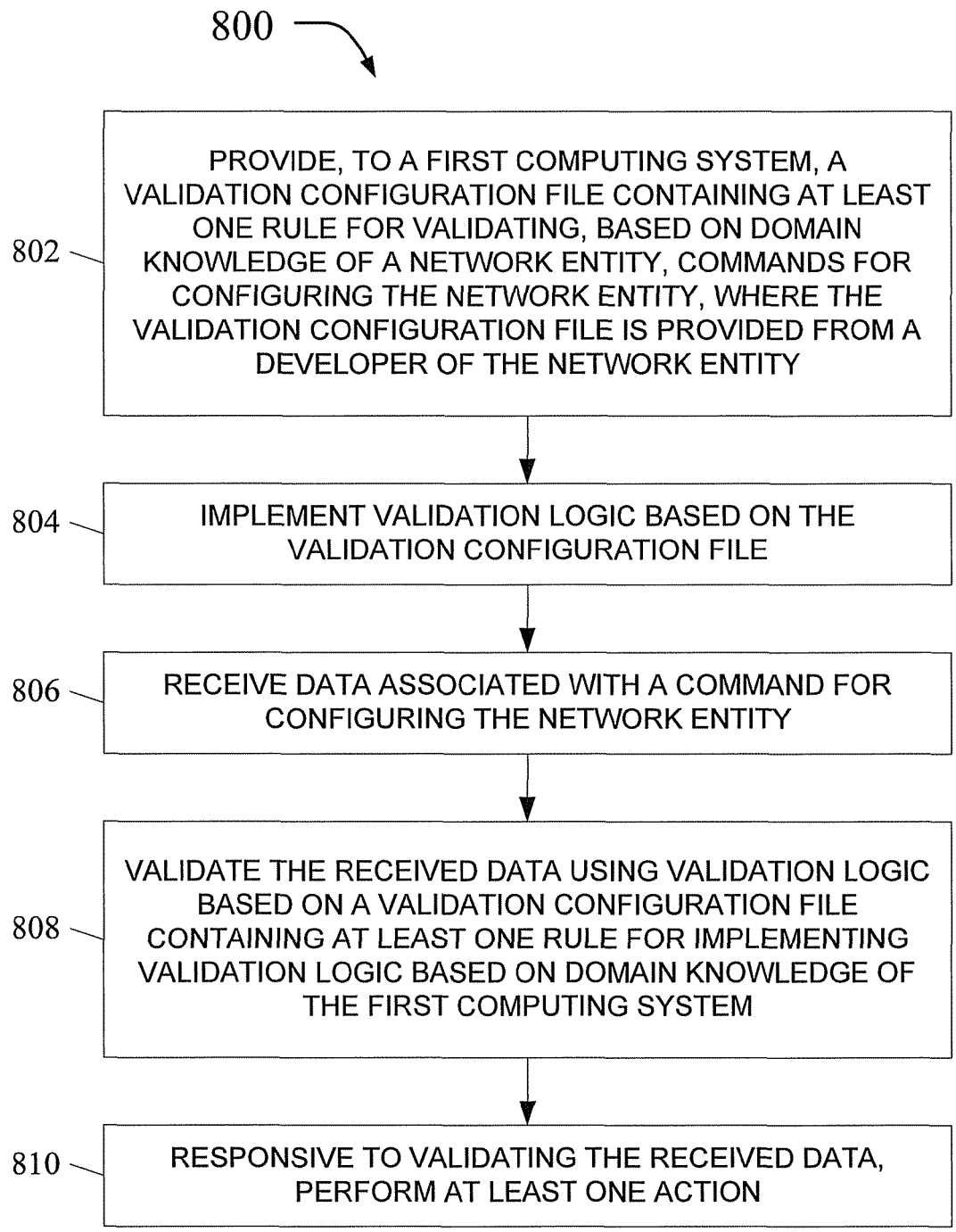
FIG. 8 is a flow chart illustrating an exemplary process for implementing a validation framework for validating commands for configuring entities in a telecommunications network according to an embodiment of the subject matter described herein.

FIG. 8 is a flow chart illustrating an exemplary process for implementing a validation framework for validating commands for configuring entities in a telecommunications network according to an embodiment of the subject matter described herein. In one embodiment, process 800 may be embodied as computer executable instructions that are stored on a computer readable medium and may be executed by a processor of a computer, such as a processor of a network element (e.g., a security gateway) or a management system.

At block 802, a validation configuration file is provided to a first computing system. The validation configuration file contains at least one rule for validating commands for configuring the network entity, based on domain knowledge of a network entity. The validation configuration file is provided from a developer of the network entity. In one embodiment, the validation configuration file is a single-sourced validation configuration file that includes information from a developer of the target computing system. For example, a software development team for network element 708 may create the validation configuration file for NE 708. In one embodiment, responsive to a change in the validation configuration file by the developer of the network entity, an updated validation configuration file may be distributed to the receiver. For example, validation configuration files may be available for download or automatic updates may occur at a validating entity (e.g., computing system) when new or updated configuration files are created for a given network entity. Alternatively, the validation configuration file provider may provide notifications that an updated version of the validation configuration file is available, and the receiver is responsible for downloading or accessing and processing the updated validation configuration file.

A receiver may be a hardware developer, a software developer, a service provider, a network element, or a management system, such as an NMS or EMS. For example, a validation configuration file may be provided to an EMS development team that will manage the NE. In another example, the validation configuration file may be provided to an EMS which is configured to use the validation configuration file.

In the embodiment illustrated in FIG. 8, at block 804, validation logic based on the validation configuration file is implemented. In one embodiment, implementing validation logic may include converting the validation configuration file in to computer-executable instructions or converting the validation configuration file for use with computer-executable instructions. For example, a development team of EMS 702 may convert the validation code into computer-executable instructions for performing data validation at the EMS. In another example, an EMS may be configured to convert a human-readable validation configuration file (e.g., an XML file) into machine-usable data sets (e.g., binary code) and/or may implement computer-executable instructions (e.g., machine code, byte code, etc.) for using the information in the validation code. As stated above, one or more validation configuration files may be used in creating or implementing data validation logic. Such logic may be used for data validation.

At block 806, data associated with a command for configuring the network entity is received at the first computing system. In one embodiment, data includes input received from an interface, such a GUI module, a CLI module, or other user interface module. Input may include any interaction with an interface including starting, initializing, closing, or stopping an interface module, opening a GUI component, changing a GUI component, closing a GUI component, selecting a GUI component, entering, removing, or replacing data.

At block 808, the received data is validated using the at least one rule. In one embodiment, the validation configuration file includes domain knowledge-related information about an entity. The validation configuration file may include information for a particular system or subsystem and/or a version of a system or subsystem of the entity. In one embodiment, the validation configuration file may be stored locally at a validating entity or remotely from the validating entity. In one embodiment, the validation configuration file may be distributed, accessed, parsed, or converted at run-time. In one embodiment, validating the data includes selecting and accessing the validation configuration file based on an identifier. An identifier may be based on the content of a validation configuration file including at least one of: a system, a system version, a subsystem, and a subsystem version. Accessing the at least one single-sourced validation configuration file may include converting and storing the at least one single-sourced validation configuration file into a machine-readable or machine-usable format, such as data sets using a binary format. In one embodiment, a machine-readable format may include computer-executable instructions, such as byte code, machine code, program-readable form, or the like.

At block 810, and performs at least one action in response to validating the received data. In one embodiment, an action in response to performing the validating includes at least one of: providing output for an interface, indicating the data is valid, indicating the data is invalid, suggesting valid input, modifying the data, deleting the data, creating new data, validating new data, and further processing the data. In one embodiment, an action may result in additional data validation (e.g., if the action performed includes creating new data). An action may also result in further processing (e.g., business logic may be applied after the validation logic).

In one embodiment, the subject matter described herein including related functionality may be described as modules, applications or processes. It is understood that these modules or processes may be implemented as computer-executable instructions embodied in a computer-readable medium that may be executed by a processor to perform at least one method (e.g., method 800 detailed above). Alternatively, the modules or processes described herein may be implemented entirely in hardware. In yet another alternative embodiment, the modules or processes described herein may be implemented as a combination of hardware and software.

It will be understood that various details of the subject matter described herein may be changed without departing from the scope of the subject matter described herein. Furthermore, the foregoing description is for the purpose of illustration only, and not for the purpose of limitation, as the subject matter described herein is defined by the claims as set forth hereinafter.

What is claimed is:

1. A method for implementing a validation framework for validating commands for configuring entities in a telecommunications network, the method comprising:

providing, to a first computing system, a validation configuration file containing at least one rule for validating, based on domain knowledge of a network entity, commands for configuring the network entity, wherein the validation configuration file is provided from a developer of the network entity, the validation configuration file being a human readable file convertible by the first computing system to a machine-readable format usable by the first computing system for performing data validation, wherein the first computing system includes a telecommunications network element; and at the first computing system, receiving data associated with a command for configuring the network entity, validating the received data using the at least one rule, wherein said validating comprises at least one of validating the command and providing presentation intelligence, wherein providing presentation intelligence includes modifying an appearance of a graphical user interface for configuring the network entity, wherein modifying the appearance of the graphical user interface includes proactively controlling input by disabling or enabling graphical user interface elements based on the capabilities of the telecommunications network element, and, responsive to validating the data, performing at least one action.

2. The method of claim 1 comprising:

responsive to a change in the validation configuration file by the developer of the network entity, distributing an updated validation configuration file to the first computing system.

3. The method of claim 1 wherein the validation configuration file is at least one of:

stored locally at the network entity;
   stored remotely from the network entity;
   stored locally at the first computing system; and
   stored remotely from the first computing system.

4. The method of claim 1 wherein the at least one rule includes:

at least one condition for triggering at least one action; and
   the at least one action to be performed in response to the at least one condition being triggered.

5. The method of claim 1 wherein domain knowledge comprises information about at least one of:

a resource of the network entity;
   a function performed by the network entity;
   an operating characteristic of the network entity;
   a configuration of the network entity;
   a characteristic of an environment in which the network entity operates; and
   information about a deployment of the network entity.

6. The method of claim 1 wherein validating, using the at least one rule, a command for configuring the network entity includes:

selecting the validation configuration file for processing;
   accessing the validation configuration file; and
   processing the validation configuration file for obtaining the at least one rule for validating commands for configuring the network entity.

7. The method of claim 6 wherein selecting the validation configuration file includes selecting the validation configuration file based on at least one of:

a type of the network entity;
   a version of the network entity;
   a configuration of the network entity;
   a component of the network entity;
   a type of a component of the network entity;
   a version of a component of the network entity;
   a configuration of a component of the network entity.

8. The method of claim 6 wherein at least one of selecting, accessing, and processing the validation configuration file occurs at runtime.

9. The method of claim 6 wherein processing the validation configuration file includes converting and storing the validation configuration file into a machine-readable format.

10. The method of claim 6 wherein at least one of selecting, accessing, and processing the validation configuration file occurs at least one of:

prior to a request for validation of input; and
    in response to a request for validation of input.

11. The method of claim 1 wherein validating a received configuration command includes validating a configuration command received via at least one of:

a graphical user interface (GUI) module;
    a command line interface (CLI) module; and
    a network communication interface module.

12. The method of claim 1 wherein the user interface includes at least one of:

a graphical user interface (GUI) module;
    a command line interface (CLI) module; and
    a network communication interface module.

13. The method of claim 1 wherein modifying the appearance of the user interface includes at least one of:

initializing an interlace;
    opening a GUI component;
    changing a GUI component;
    closing a GUI component;
    selecting a GUI component;
    entering data;
    removing data;
    replacing data; and
    providing output to the user.

14. The method of claim 1 wherein performing at least one action in response to validating the received data includes at least one of:

transmitting the received data to the network entity;
    generating a message to the source of the received data;
    discarding the received data without transmitting it to the network entity;
    providing output for an interface;
    providing actions to be performed at the network entity;
    providing actions to be performed at a second computing system;
    indicating the data is valid;
    indicating the data is invalid;
    providing valid data;
    modifying the data;
    deleting the data;

creating new data;
triggering a condition;
validating new data; and
further processing the data.

15. The method of claim 1 wherein the first computing system is a component of the network entity.

16. The method of claim 1 wherein the network entity comprises a telecommunications network element and the first computing system comprises a telecommunications element management system for managing the telecommunications network element.

17. A system for validating commands for configuring entities in a telecommunications network, the system comprising:
an interface module for receiving data associated with a command for configuring a network entity; and
a validation engine comprising a processor, the validation engine for validating the received data using at least one rule from a validation configuration file and based on domain knowledge of the network entity, wherein validating the received data comprises at least one of validating a received configuration command and providing presentation intelligence, wherein providing presentation intelligence includes modifying an appearance of a graphical user interface for configuring the network entity, wherein modifying the appearance of the graphical user interface includes proactively controlling input by disabling or enabling graphical user interface elements based on the capabilities of the telecommunications network element, wherein the validation configuration file is provided from a developer of the network entity, the validation configuration file being a human readable file convertible by the validation engine to a machine-readable format usable by the validation engine for performing data validation, wherein the first computing system includes a telecommunications network element, and, responsive to validating the data, performing an action.

18. The system of claim 17 wherein, responsive to a change in the validation configuration file by the developer of the network entity, an updated validation configuration file is distributed for use by the validation engine.

19. The system of claim 17 wherein the interface module includes at least one of:
a graphical user interface (GUI) module;
a command line interface (CLI) module; and
a network communication interface module.

20. The system of claim 17 wherein the received data includes a request to perform at least one of:
initializing an interface;
opening a GUI component;
changing a GUI component;
closing a GUI component;
selecting a GUI component;
entering data;
removing data;
replacing data; and
interacting with an interface.

21. The system of claim 17 wherein the validation engine is configured for selecting, accessing, and processing the validation configuration file containing the at least one rule.

22. The system of claim 17 wherein the validation configuration file is at least one of:
stored locally with the validation engine; and
stored remotely from the validation engine.

23. The system of claim 21 wherein at least one of selecting, accessing, and processing the validation configuration file occurs at runtime.

24. The system of claim 21 wherein processing the validation configuration file includes converting and storing the validation configuration file into a machine-readable format.

25. The system of claim 17 wherein the at least one rule includes:
an at least one condition for triggering an at least one action; and
the at least one action to be performed in response to the at least one condition being triggered.

26. The system of claim 17 wherein performing at least one action in response to validating the received data includes at least one of:
transmitting the received data to the network entity;
generating a message to a source of the received data;
discarding the received data without transmitting it to the network entity providing output for an interface;
providing actions to be performed at the network entity;
providing actions to be performed at the source of the received data;
indicating the data is valid;
indicating the data is invalid;
providing valid data;
modifying the data;
deleting the data;
creating new data;
triggering a condition;
validating new data; and
further processing the data.

27. The system of claim 17 wherein the interface module and the validation engine reside in at least one of: a telecommunications network element, a telecommunications element management system for managing the telecommunications network element, and a network management system.

28. A non-transitory computer readable medium having stored thereon computer executable instructions that when executed by a processor of a computer control the computer to perform steps comprising:
providing, to a first computing system, a validation configuration file containing at least one rule for validating, based on domain knowledge of a second computing system, commands for configuring the second computing system, wherein the validation configuration file is provided from a developer of the second computing system, the validation configuration file being a human readable file convertible by the first computing system to a machine-readable format usable by the first computing system for performing data validation, wherein the first computing system includes a telecommunications network element; and
at the first computing system, receiving data associated with a command for configuring the second computing system, validating the received data using the at least one rule, wherein said validating comprises at least one of validating the command and providing presentation intelligence, wherein providing presentation intelligence includes modifying an appearance of a graphical user interface for configuring the network entity, wherein modifying the appearance of the graphical user interface includes proactively controlling input by disabling or enabling graphical user interface elements based on the capabilities of the telecommunications network element, and, responsive to validating the data, performing at least one action.

* * * * *